Dec. 7, 1954 T. M. MOORE Re. 23,903

FEED CONTROL FOR HAMMER MILLS

Original Filed Oct. 13, 1948

INVENTOR
THOMAS M. MOORE
DECEASED
By BANK OF SALEM
ADMINISTRATOR
BY Lee L. Turnbaugh
ATTORNEY.

United States Patent Office

Re. 23,903
Reissued Dec. 7, 1954

23,903

FEED CONTROL FOR HAMMER MILLS

Thomas Munsey Moore, deceased, late of Salem, Va., by the Bank of Salem, administrator, Salem, Va., assignor, by mesne assignments, to Robert A. Moore, Salem, and Bank of Salem, Salem, Va., as guardians for the infant children recited of Thomas Munsey Moore, deceased Original No. 2,609,153, dated September 2, 1952, Serial No. 54,272, October 13, 1948. Application for reissue August 10, 1953, Serial No. 374,165

8 Claims. (Cl. 241—186)

Matter enclosed in heavy brackets [ ] appears in the original patent but forms no part of this reissue specification; matter printed in italics indicates the additions made by reissue.

This invention relates to a feed control for hammer mills.

The primary object of the invention is to control the feed of material to the mill so that it is substantially held in a state of suspension during hammer impact irrespective of the nature of the material being ground.

Another object of the invention is to provide a feed control adapted to be installed in a previously built mill or built with the mill that results in suspension grinding of the material without a material change of conventional mill structure.

A further object of the invention is to permit an adjustment of the control for use with different materials without a change of the pre-set arrangement of parts necessary for suspension grinding during the milling operation.

Still another object of the invention is to provide means for adjusting the control from the exterior of the mill so that any desired changeover may be made during continuous operation of the hammers.

Still another object of the invention is to eliminate the possibility of choking the mill in operation due to the retarded material flow necessary for suspension grinding.

These and other objects of the present invention will appear as the following description thereof proceeds, and in order to more clearly understand the invention, references may be had to the accompanying drawings in which an embodiment of the invention is shown.

Figure 1:
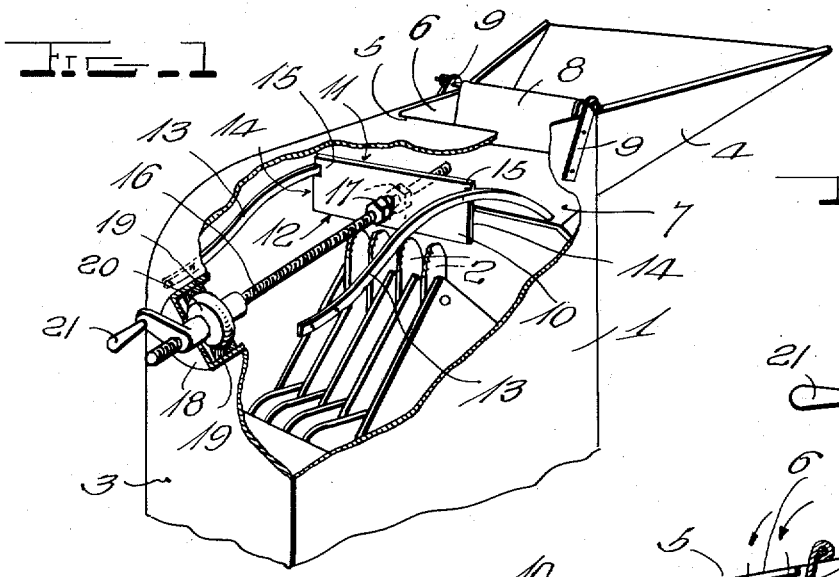
Figure 1 is a fragmentary perspective showing the feed control applied to a hammer mill.
Figure 4:
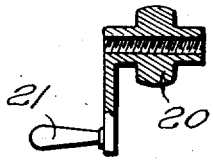
Figure 4 shows the operation nut of the control adjustment.

In a conventional hammer mill of the rotary hammer type the material to be ground is fed at the top of the mill usually at one side into and against the upper arc of the throw of the hammers which rotate in the same direction with respect to the flow. This results in a helter skelter throw of the material in the mill head upon hammer impact and subefficient grinding. Unground material is bounced around in the head before actual hammer impact causing excessive wear against the back wall and unless the feed control is continually supervised an underfeed or overfeed results. The ideal grinding condition is where the feed is such that the material fed to the rotary hammers is loosely held by its own weight in a state of suspension so that substantially only ground material passes to the usual concave screen in the bottom of the mill. This is the objective of the invention disclosed.

As the mill disclosed is primarily for grinding grains or the like and as the weight of such materials vary, an adjustment to compensate for such variations without destroying the pre-setting for suspension grinding is essential. In other words the control is pre-set for the type of material to be ground, such as wheat, oats, rye, etc., so as to result in suspension grinding during rotation of the hammers. When a changeover is made to another say free flowing material, the control may be given a compensating adjustment without altering the pre-set arrangement for suspension grinding and also without disturbing the continuous operation of the mill.

For the purpose of illustration there is shown a hammer mill having the usual flat sides 1, with rotary hammers 2. Only the upper half of the hammers are shown and it is well understood that the lower part of the mill includes the concave screen and fan, not illustrated. The mill includes the usual top and back cover 3 terminating short of an upper side feed trough 4, as at 5, to provide an air feed 6. The trough 4 is inclined and has an extension 7 to direct the material into the hammer into the hammers 2 in the upper arc of their throw in the same direction of their rotation and to one side. This is conventional hammer mill structure and forms no part of my invention. There is provided across the trough 4 a protector plate 8 adjustably mounted in end brackets 9 secured preferably to opposite sides of the mill. This plate is not a feed control but merely prevents free flowing material like wheat, oats or the like from filling up the entire trough and choking off the air inlet or feed 6. When bulk material such as hay or ear corn is being ground it may be swung out of the way.

Figure 2:
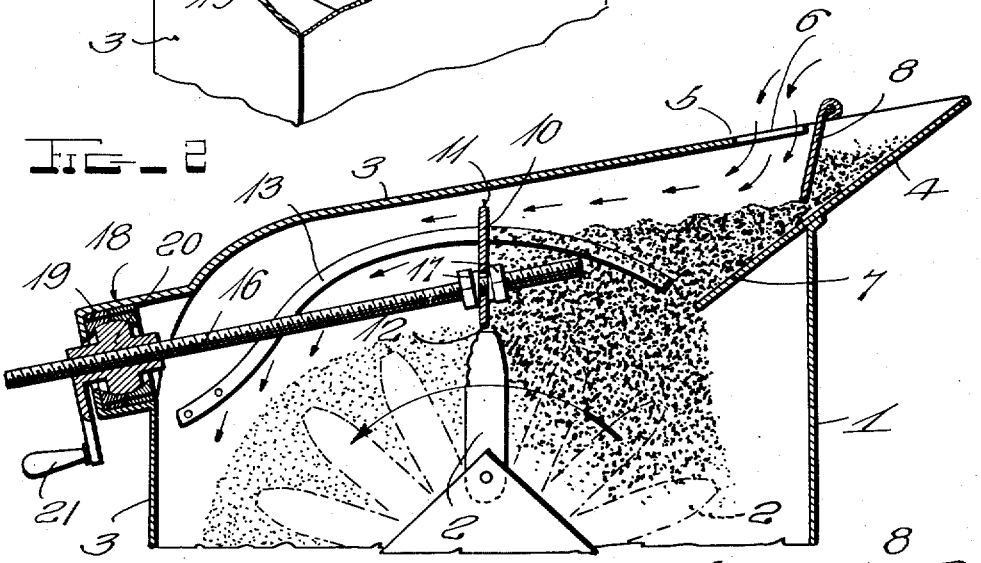
Figure 2 is a vertical section through the mill head with certain parts in elevation showing the grinding operation.

To obtain suspension grinding there is suspended entirely across the top of the mill a rigid unperforate plate 10, usually formed of cold rolled steel. This plate is positioned substantially as shown in Figure 2 and being arranged adjacent the feed inlet acts as a baffle to control the inlet flow of material to be ground and restrict the area of hammer contact. The plate 10 is so mounted that its upper edge 11 is always spaced below the top 3 of the mill to permit a continuous flow of air thereover as indicated by arrows in Figure 2, *when grinding shelled grains*. The lower edge 12 of the plate 10 is pre-set the required distance from the outer arc of the throw of the hammers 2 to permit impacted or ground material to pass thereunder and hence to the concave screen in the well known manner.

With the parts arranged as shown in Figures 1 and 2 of the drawing the plate 10 acts as a feed control distributor, baffle and spreader. It will act as a restrictor of the size of the grinding chamber and the material being ground on the inlet side of the plate 10 will be held in suspension and in a state of agitation against the baffle plate so that a very effective grinding action occurs from the impact of the hammers on this freely suspended mass. Practically all the material that passes under the lower edge of the plate is ground so consequently the wear on the back of the mill is greatly reduced. The operation of a mill with this type of control in the top is about one-third more efficient than without it.

[The pre-setting of the lower edge 12 of the plate 10 with respect to the arc of the throw of the hammers is important as this space is maintained for all free flowing materials. The protector plate 8 in the trough 4 does not control the inlet flow of material and only protects the air inlet 6. Also the spacing of the upper edge 11 from the top of the mill is a necessary feature. While some air would of course pass through the material and beneath the lower edge of the plate this is not enough for the proper functioning of the mill. The positioning of the plate 10 across the top of the mill in line with the throw of the material from the hammers necessarily retards the normal air flow so air flow means around the baffle plate must be provided that is not obstructed by the material being ground.] In Figure 2 is illustrated the position the unground material takes during mill operation. It rises to near the top of the plate 10 and its top surface is in undulating waves during operation of the rotary hammers.

[As before stated it is necessary to adjust the baffle plate 10 for materials of different weight without however disturbing the pre-set arrangement for suspension grinding. This is accomplished by mounting on opposite inner faces of side walls of the mill that are at right angles to the axis of the hammers two tracks 13 which are preferably curved throughout their effective lengths substantially parallel with respect to arc of the outer throw of the hammers and beyond the same.] *As before stated it is an object of this invention to adjust the baffle plate 10 to grind materials of different weight and size without disturbing the set adjusted position for suspension grinding of any material being ground. In the illustrated form this is accomplished by mounting on opposite inner faces of the side walls of the mill head that are at right angles to the axis of the hammers, guide means that in this instance comprise two tracks 13 which are curved throughout their effective lengths when the baffle plate is adjusted for suspension grinding of shelled grains, substantially parallel with respect to the arc of the outer throw of the hammers but extend beyond the same on a slightly reversed curve to adjacent the back of the mill head to receive the baffle plate 10 when grinding hay or other loose materials and which still results in suspension grinding.* The ends 14 of the plate 10 which are close to said side walls have notches 15 adjacent the upper edge 11 that engage over said tracks so that the plate 10 is held and guided thereby.

To permit adjustment of the plate 10 along the arc of the throw of the hammers 2 and toward and from the mill inlet there is provided a long screw 16 having its inner end rigidly connected with the plate 10 by projecting through an opening medially adjacent the lower edge 12 and held in position by opposed inclined faced nuts 17. The outer end of the screw extends through a housing 18 in the rear of the top 3 of the mill. A universal joint of the ball and socket type 19 connects a rotatable nut 20 with the housing and the screw 16 passes through said nut. An exterior crank handle 21 is provided for rotation of the nut.

Figure 3:
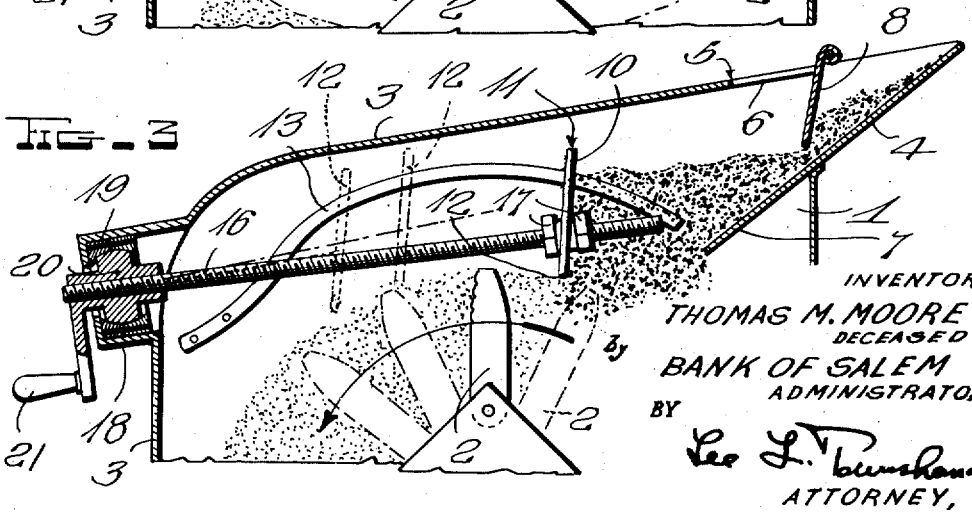
Figure 3 is a similar view showing in dotted lines different positions of the control.

It is apparent that rotation of the handle 21 from the exterior of the mill will move the screw 16 lengthwise through the nut 20, either in or out of the mill. This operation will move the plate 10 along the tracks 13 toward or from the inlet. Various positions of the plate are shown in dotted lines in Figure 3. For free flowing materials such as wheat, oats, rye, etc., the adjustment would be around the upper arc of the hammers. For bulky materials such as hay or earn corn the plate 10 is backed to the rear limit on the tracks 13.

From the foregoing description it is apparent that a hammer mill equipped with the type of feed control disclosed will suspend the incoming material in a loose mass having a restricted area of hammer contact at the upper arc of the throw of the hammers. The control or baffle plate acts as a regulator distributor, baffle and spreader for the fed material and regulates, restricts and distributes the material so that the amount fed is effectively impacted over the entire width of the hammers. Practically only ground material passes under the lower edge of the plate so undue wear on the back of the mill is eliminated. The adjustment of the control plate toward or from the material inlet permits a changeover for different materials without disturbing the pre-set adjustment for suspension grinding or shutting down the mill. As this adjustment is from the exterior of the mill it may be accomplished in a few seconds without the necessity of opening up the mill. [As the control or baffle plate usually cuts down the size of the grinding chamber, the adequate air feed through the top of the mill and over the plate is a necessary feature. Without such a provision the mill would choke.] This feed control is practically a unitary structure that may be installed in previously built mills or built with the mill. After once set no further attention is required on the part of the operator and the only adjustment is the changeover for different materials. The more effective grinding action has been found to prolong the life of the screen by reducing the amount of unground material passing thereover.

*The term set or pre-set is used merely to define an adjusted position of the baffle to grind shelled grain like wheat, oats, rye, etc. or other unshelled material like hay, etc. that will always result in suspension grinding of any of said materials. Obviously the size and weight of for instance a grain of wheat and a grain of corn varies and still another problem arises when grinding for instance hay or other loose materials. An adjustment of the area of impact on each different type of material is necessary to attain the desired result of suspension grinding for each.*

*The term clearance between the top of the baffle plate and mill head and bottom of the baffle plate and arc of throw of the hammers indicates a mere free running clearance is all that is necessary for functioning. With reference to air every mill must have sufficient air to prevent choking. In the illustrated form of this invention for grinding shelled grains sufficient air is pulled over the clearance between the top of the baffle plate and mill head to afford the air requirements for any position of the baffle plate. However, when the baffle plate 10 is backed off the curved tracks 13 for suspension grinding of for instance a loose material like hay, little or no air clearance is necessary as essential quantities of air is in the loose material fed. The top clearance for air merely means the suspended plate will never choke the mill. It is obvious exact location of the plate or location of the air feed is not relevant to this invention except in a mill head structure used for illustrative purposes.*

*The term clearance with respect to the arc of the throw of the hammers and bottom edge of the baffle plate is used to indicate a mere free running clearance is all that is necessary for functioning. It may substantially although not exactly (see Fig. 3) follow the same arc as when grinding shelled grains when curved tracks 13 are used in a preferred form illustrated. It is only important that the clearance will permit unobstructed flow of whatever material is being ground at any position of the baffle plate that will result in suspension grinding of said material.*

*The speed of the motor that rotates the hammers is of course under control of the mill operator and obviously may be varied if necessary after change overs to maintain suspension grinding without choking and power surges of the mill.*

This application is a continuation-in-part of application Serial No. 49,762 filed September 17, 1948, now abandoned.

What is claimed is:

1. A feed control for hammer mills including rotating hammers, a material feed inlet at the top of the mill to flow material to be ground into the upper arc of the throw of the hammers at one side thereof, a pre-set baffle plate extending across the mill top adjacent the inlet in line with the throw of material by the hammers, said baffle plate being positioned substantially radially with respect to the axis of the hammers and spaced above the arc of the hammer throw and below the top of the mill, curved supporting tracks for said baffle plate secured to opposite sides of the mill, said tracks being substantially parallel to the arc of throw of the hammers, means to move said baffle plate along said tracks including a screw having one end rigidly connected with said plate and extending through the wall of the mill, a nut for said screw universally mounted in the wall of the mill, and a crank for rotating said nut exterior of the mill.

2. A feed control for hammer mills including rotating hammers, a material feed inlet at the top of the mill to flow material to be ground into the upper arc of the throw of the hammers in the same direction of rotation and at one side thereof, a separate unitary set baffle plate suspended across the top of the mill head and having a top and bottom edge clearance with respect to the mill head and throw of the hammers for unobstructed flow of air and material, tracks in the mill head upon which the baffle plate is mounted, and means to move the baffle plate along said tracks toward or from the incoming flow of fed material to maintain suspension grinding for various types of material to be ground.

3. A feed control for hammer mills including rotating hammers, a material feed inlet at the top of the mill to flow material to be ground into the upper arc of the throw of the hammers in the same direction of rotation and at one side thereof, a separate unitary set baffle plate suspended across the top of the mill head and having a top and bottom edge clearance with respect to the mill head and throw of the hammers for unobstructed flow of air and material, tracks in the mill head upon which the baffle plate is mounted, means to move the baffle plate along said tracks toward or from the incoming flow of fed material to maintain suspension grinding for various types of material to be ground, and said means being operable from the exterior of the mill.

4. A feed control for hammer mills including rotating hammers, a material feed inlet at the top of the mill to flow material to be ground into the upper arc of the throw of the hammers in the same direction of rotation and at one side thereof, a separate unitary set baffle plate suspended across the top of the mill head and having a top and bottom edge clearance with respect to the mill head and throw of the hammers for unobstructed flow of air and material, curved supporting tracks for said baffle plate secured to opposite sides of the mill head, said tracks being substantially parallel to the arc of throw of the hammers, and means to move the baffle plate along said tracks toward or from the incoming flow of fed material to maintain suspension grinding for various types of material to be ground.

5. A feed control for hammer mills including rotating hammers, a material feed inlet at the top of the mill to flow material to be ground into the upper arc of throw of the hammers in the same direction of rotation and at one side thereof, a separate unitary set baffle plate suspended across the top of the mill head and having a top and bottom edge clearance with respect to the mill head and throw of the hammers for unobstructed flow of air and material, cooperating means between the baffle plate and mill top permitting movement of the baffle plate toward or from the incoming flow of fed material without disturbing the clearances of the set position, and adjusting means to move the set baffle plate in the mill head toward or from the incoming flow of fed material to maintain suspension grinding for various types of material to be ground.

*6. A feed control for hammer mills including rotating hammers, a material feed inlet at the top of the mill to flow material to be ground into the upper arc of the throw of the hammers in the same direction of rotation and at one side thereof, a baffle plate suspended across the mill head to distribute the fed material over a confined area of hammer impact to hold the particular material being then fed in constant suspension during grinding, cooperating means between the baffle plate and mill top permitting movement of the baffle plate toward or from the incoming flow of fed material to vary the area of hammer impact when the type of fed material is changed, and adjusting means to move the baffle in the mill head toward or from the incoming flow of different material to a set position to maintain suspension grinding for that particular material whereby various types of material may be ground in suspension in a single mill.*

*7. A feed control for hammer mills including rotating hammers, a material feed inlet at the top of the mill to flow material to be ground into the upper arc of the throw of the hammers in the same direction of rotation and at one side thereof, a baffle plate suspended across the mill head to distribute the fed material over a confined area of hammer impact to hold the particular material being then fed in constant suspension during grinding, tracks on the mill head upon which the baffle plate is mounted permitting movement of the baffle plate toward or from the incoming flow of fed material to vary the area of hammer impact when the type of fed material is changed, and adjusting means to move the baffle in the mill head toward or from the incoming flow of different material to a set position to maintain suspension grinding for that particular material whereby various types of material may be ground in suspension in a single mill.*

*8. A feed control for hammer mills including rotating hammers, a material feed inlet at the top of the mill to flow material to be ground into the upper arc of the throw of the hammers in the same direction of rotation and at one side thereof, a baffle plate suspended across the mill head to distribute the fed material over a confined area of hammer impact to hold the particular material being then fed in constant suspension during grinding, cooperating means between the baffle plate and mill top permitting movement of the baffle plate toward or from the incoming flow of fed material to vary the area of hammer impact when the type of fed material is changed, adjusting means to move the baffle in the mill head toward or from the incoming flow of different material to a set position to maintain suspension grinding for that particular material whereby various types of material may be ground in suspension in a single mill, and said adjusting means being operable from the exterior of the mill.*

References Cited in the file of this patent or the original patent

UNITED STATES PATENTS

| Number | Name | Date |
|---|---|---|
| 781,748 | Smith | Feb. 7, 1905 |
| 1,120,250 | Sturtevant | Dec. 8, 1914 |
| 1,200,104 | Haskell | Oct. 3, 1916 |
| 1,457,210 | Crane | May 29, 1923 |
| 1,553,293 | Sturtevant | Sept. 8, 1925 |
| 1,742,511 | Kuntz | Jan. 7, 1930 |
| 2,008,841 | Sherman | July 23, 1935 |
| 2,145,728 | Mankoff | Jan. 31, 1939 |
| 2,224,442 | Mankoff | Dec. 10, 1940 |
| 2,241,667 | Mankoff | May 13, 1941 |
| 2,287,799 | Hartshorn | June 30, 1942 |
| 2,482,279 | Lemmon et al. | Sept. 20, 1949 |

FOREIGN PATENTS

| Number | Country | Date |
|---|---|---|
| 7,543 | Great Britain | Mar. 26, 1910 |